United States Patent Office 3,823,156
Patented July 9, 1974

3,823,156
PROCESS FOR THE PRODUCTION OF PYRAZOLONE DERIVATIVES
Eitaro Oku, Daijiro Nishio, and Hirokatsu Ezawa, Odawara, Kanagawa, Japan, assignors to Fuji Photo Film Co., Ltd., Kanagawa, Japan
No Drawing. Filed Dec. 6, 1971, Ser. No. 205,309
Claims priority, application Japan, Dec. 4, 1970, 45/106,716
Int. Cl. C07d 49/18
U.S. Cl. 260—310 A                    7 Claims

ABSTRACT OF THE DISCLOSURE

A process for the production of a pyrazolone derivative represented by the general formula $$\begin{array}{c} J-C\text{------}CH_2 \\ \parallel \quad | \\ N \quad C=O \\ \diagdown N \diagup \\ | \\ B \end{array}$$

wherein B represents $-\langle\text{phenyl}\rangle-X_m$ where X, which may be the same or different when $m$ is 2–5, represents a hydrogen atom, an alkyl group, an alkoxyl group, an aryl group, an aryloxyl group, a cyano group, or a halogen atom, and $m$ is 1–5, and J represents $$\left[ A-O\overset{R}{\underset{|}{C}}HCONH-\langle\text{phenyl}\rangle-CONH- \right]_n$$

wherein A represents $-\langle\text{phenyl}\rangle\begin{array}{c}R_1\\R_2\end{array}$ where $R_1$ is a hydrogen atom or an alykyl group and $R_2$ is an alkyl group; R represents a hydrogen atom or an alkyl group having 1–6 carbon atoms, and $n$ is 0 or 1 or $$A-O\overset{R}{\underset{|}{C}}HCONH-\langle\text{phenyl}\rangle-NHCONH-$$

wherein A and R have the same meaning as defined above, which comprises condensing a compound represented by the following general formula $$A-O\overset{R}{\underset{|}{C}}HCOCl$$

wherein A and R have the same meaning as defined above and one compound represented by one of the following general formulae:

$$\begin{array}{c} H_2N-C\text{------}CH_2 \\ \parallel \quad | \\ N \quad C=O \\ \diagdown N \diagup \\ | \\ B \end{array}$$

wherein B has the same meaning as defined above, $$H_2N-\langle\text{phenyl}\rangle-CONH-C\text{------}CH_2$$
$$\parallel \quad |$$
$$N \quad C=O$$
$$\diagdown N \diagup$$
$$|$$
$$B$$

wherein B has the same meaning as defined above, or $$H_2N-\langle\text{phenyl}\rangle-NHCONH-C\text{------}CH_3$$
$$\parallel \quad |$$
$$N \quad C=O$$
$$\diagdown N \diagup$$
$$|$$
$$B$$

wherein B has the same meaning as defined above in acetonitrile under such conditions which form the hydrochloride or the amine salt of the objective compound, and thereafter recovering said objective compound from the hydrochloride or amine salt form.

BACKGROUND OF THE INVENTION

1. Field of the Invention

The present invention relates to a process for the production of a magenta coupler used for color photography.

2. Description of the Prior Art

It has been disclosed in U.S. Pats. 2,600,788, 2,908,573 and 3,062,653 and British Pat. 1,142,553 that pyrazolone derivatives shown by the following general formulae (I), (II), and (III) are particularly useful as magenta couplers for color photography by a substractive color process.

$$A-O\overset{R}{\underset{|}{C}}HCONH-C\text{------}CH_2$$
$$\parallel \quad |$$
$$N \quad C=O$$
$$\diagdown N \diagup$$
$$|$$
$$B \qquad (I)$$

$$A-O\overset{R}{\underset{|}{C}}HCONH-\langle\text{phenyl}\rangle-CONH-C\text{------}CH_2$$
$$\parallel \quad |$$
$$N \quad C=O$$
$$\diagdown N \diagup$$
$$|$$
$$B \qquad (II)$$

$$A-O\overset{R}{\underset{|}{C}}HCONH-\langle\text{phenyl}\rangle-NHCONH-C\text{------}CH_2$$
$$\parallel \quad |$$
$$N \quad C=O$$
$$\diagdown N \diagup$$
$$|$$
$$B \qquad (III)$$

wherein A represents $-\langle\text{phenyl}\rangle\begin{array}{c}R_1\\R_2\end{array}$ (where $R_1$ is a hydrogen atom or an alkyl group and $R_2$ is an alkyl group, wherein the alkyl group of $R_1$ and $R_2$ may be any group conventional in this art, preferably 1–20 carbon atoms, more preferably 1–4 carbon atoms), R represents a hydrogen atom or an alkyl group having 1–6 carbon atoms, and B represents $-\langle\text{phenyl}\rangle-X_m$ (wherein X, which may be the same or different, is a hydrogen atom, an alkyl group, an alkoxyl group, preferably 1–4 carbon atoms, an aryl group, an aryloxyl group, a cyano group, or a halogen atom and $m$ is 1–5). Referring to X, when aryl, many materials are included; e.g., phenyl, alkylsulfonyl-substituted phenyl, arylsulfonyl-substituted phenyl, etc., when aryloxyl, X preferably includes, e.g., compounds such as phenoxy alkyl-substituted phenoxy, etc.

According to a typical process for producing these compounds described in the above-mentioned specifications, these compounds are generally produced by reacting the corresponding 1-aryl-3-(3-amino-benzoylamido)-5-pyrazolone and the chloride of a 2,4-dialkylphenoxy-acetic acid, 2,4-dialkylphenoxypropionic acid, or 2,4-dialkylphenoxybutyric acid.

Because each of these known processes is a general process of producing acid amides from an amine and an acid chloride, such various processes have hitherto been known as Schotten Baumann processes, Claisen processes, acetic acid-sodium acetate processes, pyridine solvent processes, and acetonitrile solvent processes, but many of these processes are unsuitable for producing magenta couplers as of high quality suitable as materials couplers having suitable quality for photographic material by such known processes, the yield for the product frequently becomes less than 50%. This is because in these known processes the separation of the objective compound, unreacted raw materials, and by-products is not easily practiced, owing to the considerable solubility of the objective compound in general organic solvents. Thus, in the known processes complicated processing steps are required, which greatly reduces the yield or efficiency.

SUMMARY OF THE INVENTION

It is, therefore, an object of this invention to provide a novel process of producing pyrazolone derivatives, which has been developed to reduce the above-described faults of conventional processes.

The invention thus relates to a process for producing a pyrazolone derivative represented by the following general formula (IV)

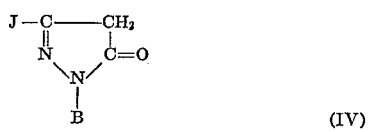

(IV)

wherein B has the same meaning as defined above and J represents

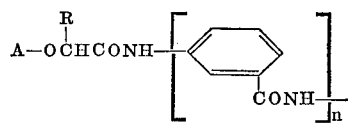

(wherein A and B have the same meanings as defined above and n is 0 or 1), or

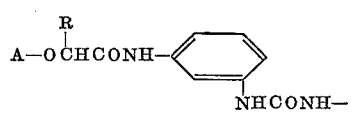

(wherein A and R have the same meanings as defined above), which comprises condensing the compound represented by the following general formula (V)

(V)

wherein A and R have the same meanings as defined above, and the compound represented by the following general formulae (VI), (VII) or (VIII).

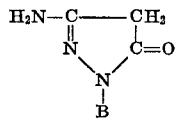

(VI)

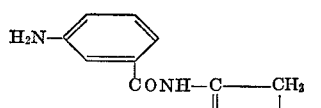

(VII)

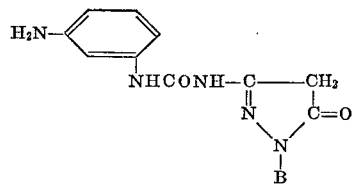

(VIII)

wherein B has the same meaning as defined above in acetonitrile under conditions to form the hydrochloride or the amine salt of the objective compound to produce the hydrochloride or the amine salt as an intermediate product.

The molar ratio of Compound (V), Compound (VI), (VII) or (VIII) can be varied as desired, but preferably is about 1 to about 1.2:1 to obtain the best results. In addition, about 1 part by weight of reactants should be employed per 1–5 parts acetonitrile by volume.

DESCRIPTION OF THE PREFERRED EMBODIMENTS

In the process of this invention the condensation reaction is conducted in acetonitrile and the hydrochloride or amine salt of the objective compound is obtained as an intermediate product which is only slightly soluble in general organic solvents and hence the intermediate can be readily separated in a subsequent step and thus the objective compound can be obtained with good yield and in a high quality as compared with the product produced by the conventional processes mentioned above. In the subsequent treatment the intermediate compound may be treated with a base or an acid.

Now, in the case of forming the hydrochloride of the objective compound in the process of this invention, the condensation reaction is conducted in a closed reaction system using, e.g., an autoclave or in a normal pressure system at temperatures lower than the boiling point (81.6° C.) of acetonitrile, for instance, at 75° C. In other words, the condensation reaction may be conducted with preventing hydrogen chloride formed in the reaction from escaping the reaction system. The prevention of the evolution of hydrogen chloride is very important, because the objective compound can be obtained as the hydrochloride or the amine salt having a greatly different solubility in organic solvents than the raw materials and by-products reduced whereby yield and the purity of the product are markedly increased. In this relation, in the conventional process of U.S. Pat. 3,062,653, the reaction is conducted by refluxing the reaction system in acetonitrile, and thus a coupler produced is generally easily soluble in organic solvents.

The optimum reaction temperature in an autoclave is the boiling point of acetonitrile and in such case the reaction time can be considerably reduced as compared with that in the case of conducting the reaction in a normal pressure system. In the normal pressure system, the reaction period of time is required to be about 4 hours at temperature of 60–75° C.

In case of forming the amine salt of the objective compound as the intermediate product, the reaction may be conducted in the presence of a tertiary amine and the condensation reaction conducted at the boiling point of acetonitrile. Any tertiary amine may be used. Usually, from about 2 to about 3 moles of tertiary amine per 1 mole of product is preferably used, although greater and lesser amounts are useful. The reaction can ordinarily be sufficiently conducted within 2 hours.

When the raw materials are reacted under such conditions as mentioned above, the objective compound can be obtained as the hydrochloride or the amine salt having a greatly different solubility in organic solvents than the raw materials and by-products reduced, whereby the yield and the purity of the product are markedly increased. For instance, the yields calculated from the examples described in the specification of U.S. Pat. No. 3,062,653 are:

|  | Percent |
|---|---|
| Coupler 1 | 19.7 |
| Coupler 4 | 21.1 |
| Coupler 5 | 32.5 |

The yields for the couplers are very low.

The yields for the products by the process of this invention, on the other hand, are higher than 60%, and the industrial value of the present invention is thus very large.

The reaction of this invention is shown by the following chemical reaction formulae:

(a) Formation of the hydrochloride

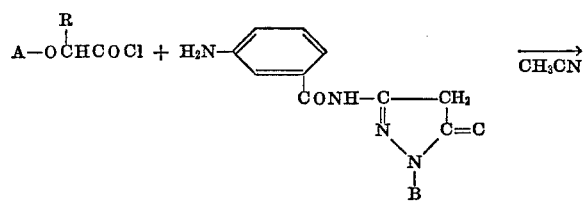

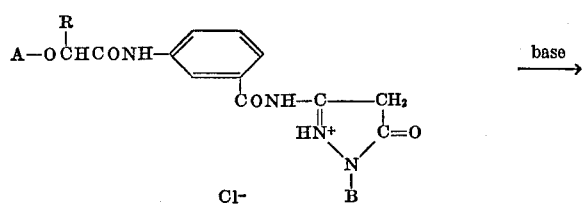

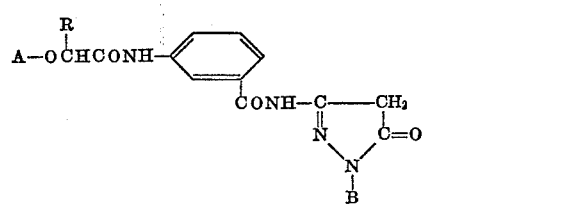

(b) Formation of the amine salt

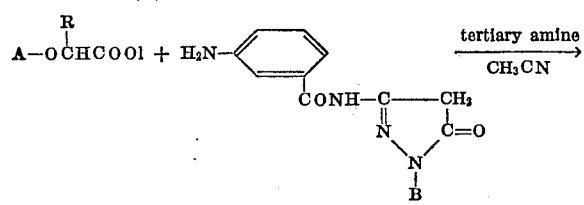

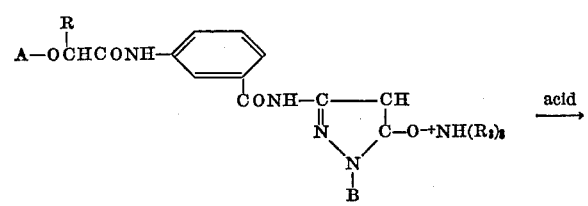

(where $R_3$ is an alkyl group)

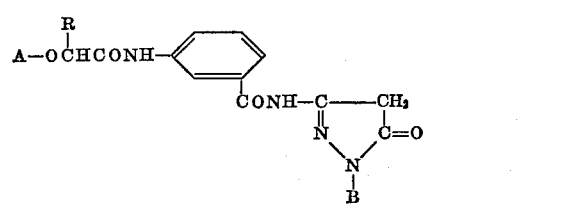

Among coupler compounds having the general formula (IV) produced by the process of this invention, A in the general formula (IV) is preferably

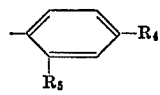

(where $R_4$ and $R_5$, which may be the same or different, represent an alkyl group having 1–5 carbon atoms), or

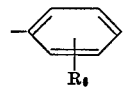

(where $R_6$ is an alkyl group having 1–20 carbon atoms).

Practical examples of this group include:

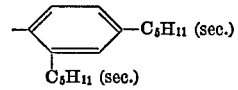

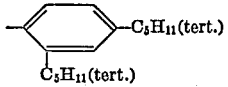 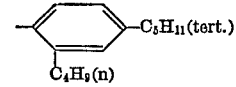

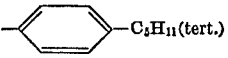

Practical examples of the group B are:

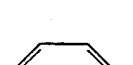 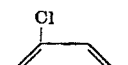 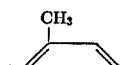 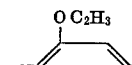

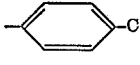 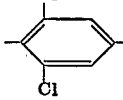 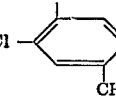 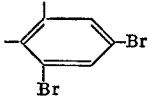

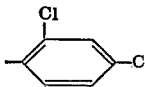 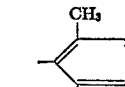 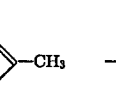

 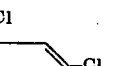 

Typical examples of couplers produced by the process of this invention are as follows:

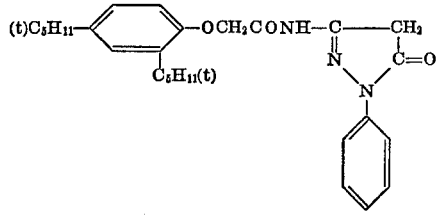

(1)

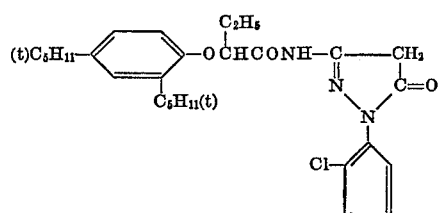

(2)

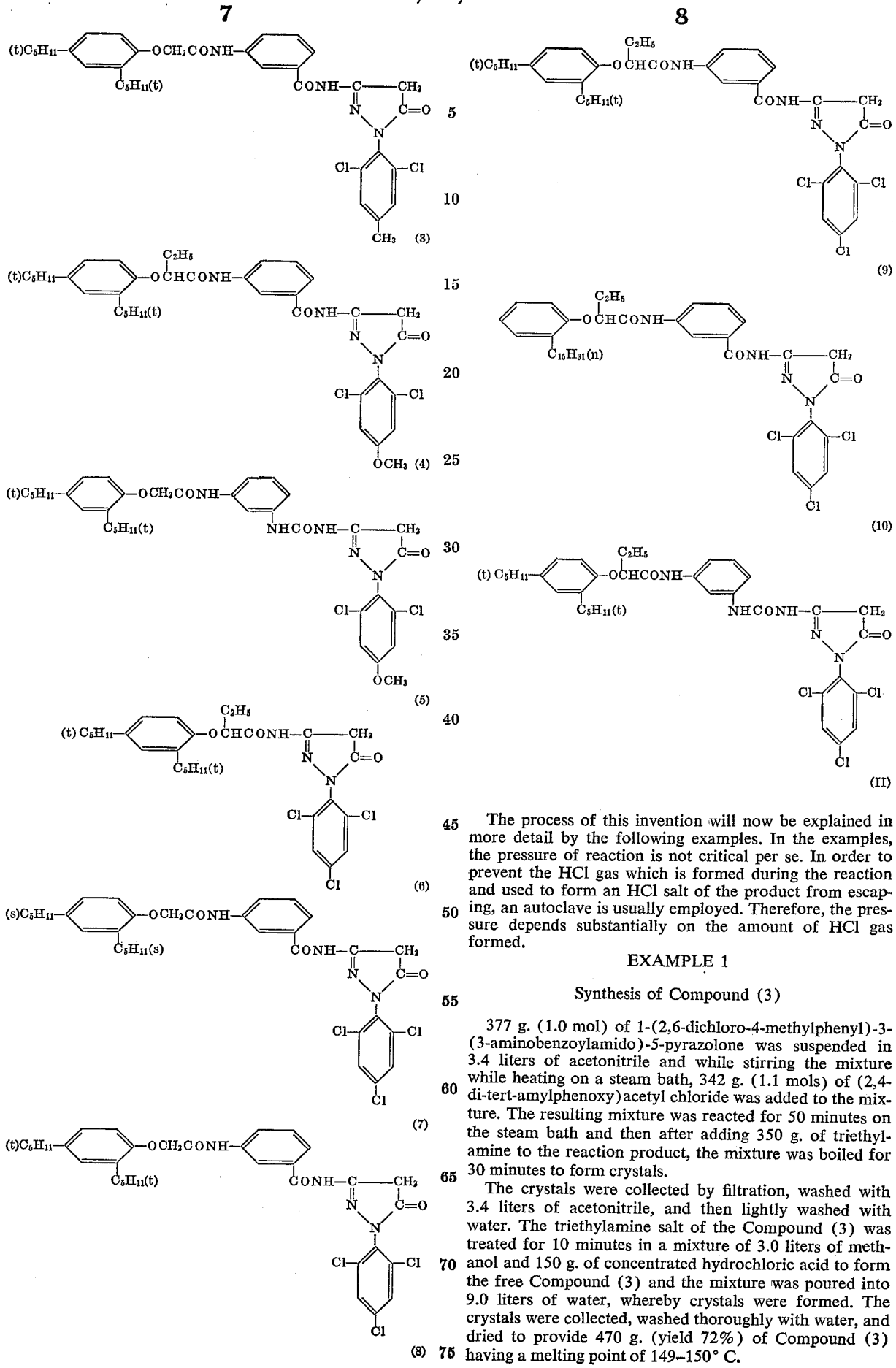

The process of this invention will now be explained in more detail by the following examples. In the examples, the pressure of reaction is not critical per se. In order to prevent the HCl gas which is formed during the reaction and used to form an HCl salt of the product from escaping, an autoclave is usually employed. Therefore, the pressure depends substantially on the amount of HCl gas formed.

EXAMPLE 1

Synthesis of Compound (3)

377 g. (1.0 mol) of 1-(2,6-dichloro-4-methylphenyl)-3-(3-aminobenzoylamido)-5-pyrazolone was suspended in 3.4 liters of acetonitrile and while stirring the mixture while heating on a steam bath, 342 g. (1.1 mols) of (2,4-di-tert-amylphenoxy)acetyl chloride was added to the mixture. The resulting mixture was reacted for 50 minutes on the steam bath and then after adding 350 g. of triethylamine to the reaction product, the mixture was boiled for 30 minutes to form crystals.

The crystals were collected by filtration, washed with 3.4 liters of acetonitrile, and then lightly washed with water. The triethylamine salt of the Compound (3) was treated for 10 minutes in a mixture of 3.0 liters of methanol and 150 g. of concentrated hydrochloric acid to form the free Compound (3) and the mixture was poured into 9.0 liters of water, whereby crystals were formed. The crystals were collected, washed thoroughly with water, and dried to provide 470 g. (yield 72%) of Compound (3) having a melting point of 149–150° C.

EXAMPLE 2

Synthesis of Compound (4)

393 g. (1.0 mol) of 1-(2,6-dichloro-4-methoxyphenyl)-3-(3-aminobenzoylamido)-5-pyrazolone and 372 g. (1.1 mols) of α-(2,4-di-tert-amylphenoxy) butyryl chloride were suspended in 3.5 liters of acetonitrile and the mixture was reacted for 4 hours at 68–70° C. with stirring.

The hydrochloride of Compound (4) which was formed was washed with 3.0 liters of acetonitrile, dissolved in 3.0 liters of methanol, and then 150 g. of triethylamine was added to the solution with stirring. After 10 minutes 100 g. of p-toluenesulfonic acid was added thereto to gradually precipitate crystals. The crystals were filtered, thoroughly washed with 4.0 liters of methanol, and dried to provide 480 g. (yield 68%) of Compound (4), having a melting point of 183–184° C. The reaction could be more effectively conducted in an autoclave.

EXAMPLE 3

Synthesis of Compound (5)

408 g. (1.0 mol) of 1-(2,6-dichloro-4-methoxyphenyl)-3-(3-aminophenylureyl)-5-pyrazolone and 343 g. (1.1 mols) of (2,4-di-tert-amylphenoxy)acetyl chloride were suspended in 3.5 liters of acetonitrile and the mixture was reacted for 3 hours at 65–68° C. with stirring.

The hydrochloride of the objective compound thus precipitated was collected by filtration and washed with 2.5 liters of acetonitrile. The hydrochloride obtained was dissolved in a mixture of 3.5 liters of methanol and 130 g. of triethylamine and after 10 minutes, 150 g. of glacial acetic acid was added, where crystals gradually precipitated. The crystals formed were collected by filtration, washed with 1.0 liter of methanol, washed with water, washed again with 1.0 liter of methanol, and dried to produce 560 g. (yield 80%) of the hydrate of Compound (5) having a melting point of 142–145° C. (The reaction could be more effectively conducted in an autoclave.)

EXAMPLE 4

Synthesis of Compound (8)

397.5 g. (1.0 mol) of 1-(2,4,6-trichloro)-3-(3-aminobenzoylamido)-5-pyrazolone and 342 g. (1.1 mols) of (2,4-di-tert-amylphenoxy)-acetyl chloride were suspended in 3.0 liters of acetonitrile and the mixture was reacted for 50 minutes while heating with stirring on a steam bath. Then, 350 g. of triethylamine was added to the reaction product and the mixture was boiled for 30 minutes, whereby crystals precipitated.

The crystals were collected by filtration, washed with 3.5 liters of acetonitrile, and washed lightly with water. The triethylamine salt of the objective compound thus obtained was treated with a mixture of 3.0 liters of methanol and 150 g. of concentrated hydrochloric acid for 10 minutes to form the objective compound and then poured into 10 liters of water, whereby crystals precipitated. The crystals were collected, washed thoroughly with water, and dried to give 357 g. (yield 68%) of Compound (8) having a melting point of 173–174° C.

EXAMPLE 5

Synthesis of Compound (11)

397.5 g. (1.0 mol) of 1-(2,4,6-trichloro)-3-(3-aminobenzoylamido)-5-pyrazolone and 372 g. (1.1 mols) of α-(2,4-di-tert-amylphenoxy)butyryl chloride were reacted in acetonitrile as in Example 2 to provide the hydrochloride of the objective compound as an intermediate product. By the same procedure as in Example 2, 490 g. (yield 70%) of Compound (11) having a melting point of 147–149° C. was obtained. (The reaction could be conducted more effectively in an autoclave.)

Although the present invention has been shown and described with reference to preferred embodiments and examples, it is to be understood that various changes and modifications can be made therefrom without departing from the scope and spirit thereof.

What is claimed is:

1. A process for the production of pyrazolone derivative represented by the general formula (IV)

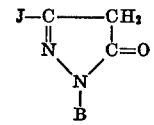

(IV)

wherein B represents

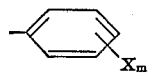

wherein X, which may be the same or different when $m$ is 2–5, represents a hydrogen atom, an alkyl group, an alkoxyl group, an aryl group, an aryloxyl group, a cyano group, or a halogen atom, and $m$ is 1–5, and J represents

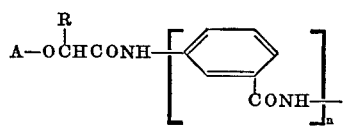

wherein A represents

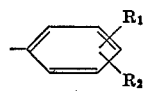

wherein $R_1$ is a hydrogen atom or an alkyl group and $R_2$ is an alkyl group; R represents a hydrogen atom or an alkyl group having 1–6 carbon atoms, and $n$ is 0 or 1, or

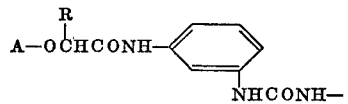

wherein A and R have the same meaning as defined above, which comprises condensing a compound represented by the following general formula (V)

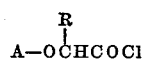  (V)

wherein A and R have the same meaning as defined above, and one compound represented by one of the following general formulae (VI), (VII) or (VIII)

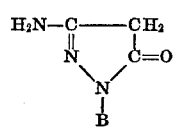

(VI)

wherein B has the same meaning as defined above,

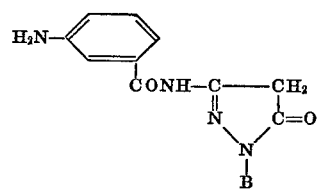

(VII)

wherein B has the same meaning as defined above, or

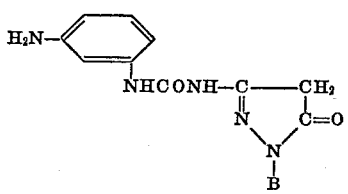

(VIII)

wherein B has the same meaning as defined above, in acetonitrile, to form a hydrochloride salt derivative of the formula

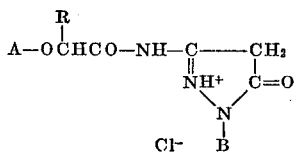

wherein A, R and B have the same meaning as defined above, or an amine salt derivative of the formula

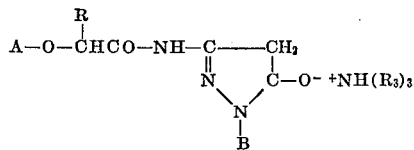

wherein $R_3$ is an alkyl and A, R and B have the same meaning as defined above, when the compound of formula (VI) is condensed;
to form a hydrochloride salt derivative of the formula

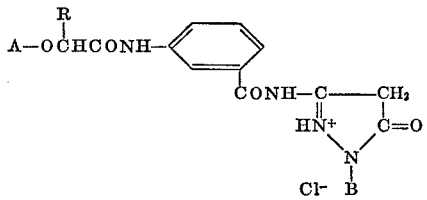

where A, R and B have the same meaning as defined above, or an amine salt derivative of the formula

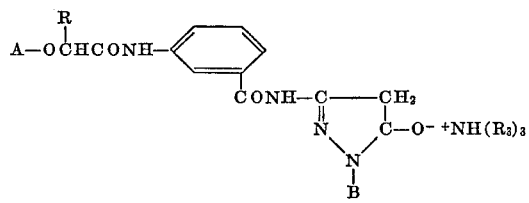

where $R_3$ is an alkyl group and A, R and B have the same meaning as defined above, when the compound of formula (VII) is condensed;
or to form a hydrochloride salt derivative of the formula

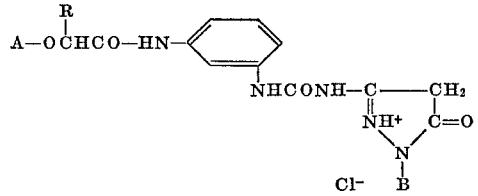

where A, R and B have the same meaning as defined above, or an amine salt derivative of the formula

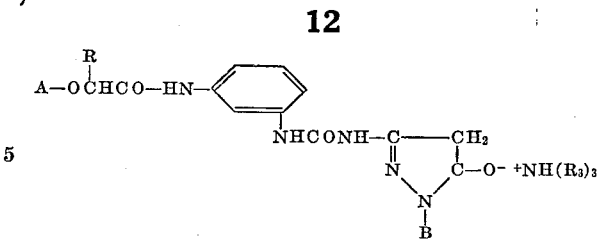

wherein $R_3$ is an alkyl group and A, R and B have the same meaning as defined above, when the compound of formula (VIII) is condensed;

as an intermediate which is substantially insoluble in acetonitrile, said hydrochloride salt derivative being formed by conducting said condensing in a closed system under autogenous or applied pressures or in an open system at normal pressure at below the boiling point of said acetonitrile whereby hydrogen chloride formed in said condensing is retained in said reaction system, said amine salt derivative being formed in an open system and in the presence of a tertiary amine whereby hydrogen chloride formed in said condensing escapes from the reaction system, and converting said hydrochloride salt and said amine salt derivative to said pyrazolone derivative of the formula (IV), said tertiary amine having the formula $$(R_3)_3N$$

wherein $R_3$ is an alkyl group.

2. The process of Claim 1, wherein the condensation is conducted in a closed system and said hydrochloride salt derivative is formed.

3. The process of Claim 1, wherein the condensation is conducted at a temperature lower than the boiling point of acetonitrile.

4. The process of Claim 1, wherein the temperature of the condensation is at about the boiling point of the acetonitrile.

5. The process of Claim 4, wherein the condensation is conducted in the presence of said tertiary amine and said amine salt derivative is formed.

6. The process of Claim 5, wherein the temperature of the condensation is at reflux temperature of acetonitrile.

7. The process of Claim 1, wherein the tertiary amine is triethylamine.

References Cited
UNITED STATES PATENTS

| | | |
|---|---|---|
| 2,865,751 | 12/1958 | Feniak et al. _____ 260—310 A |
| 3,062,653 | 11/1962 | Weissberger et al. __ 260—310 A |
| 3,615,504 | 10/1971 | Monbaliu et al. ____ 260—310 A |

OTHER REFERENCES

Jacs 64: 2135 (1942), Weissberger et al.

HENRY R. JILES, Primary Examiner
S. D. WINTERS, Assistant Examiner